United States Patent [19]

Macholdt et al.

[11] Patent Number: 5,021,473

[45] Date of Patent: Jun. 4, 1991

[54] PROCESS FOR ENHANCING THE ELECTROSTATIC CHARGEABILITY OF POWDER COATINGS OR POWDERS, AND THE USE THEREOF FOR SURFACE-COATING SOLID OBJECTS

[75] Inventors: Hans-Tobias Macholdt, Darmstadt; Alexander Sieber, Frankfurt am Main; Claus Godau, Kiedrich; Albrecht Manz, Wiesbaden, all of Fed. Rep. of Germany

[73] Assignee: Hoechst Aktiengesellschaft, Frankfurt am Main, Fed. Rep. of Germany

[21] Appl. No.: 266,510

[22] Filed: Nov. 3, 1988

[30] Foreign Application Priority Data

Nov. 5, 1987 [DE] Fed. Rep. of Germany ....... 3737496

[51] Int. Cl.$^5$ .......................... C08K 5/59; C08K 5/49; C08K 5/20; C08K 5/17
[52] U.S. Cl. .................................. 523/451; 524/154; 524/177; 524/706; 524/707; 524/780; 523/460
[58] Field of Search .............. 524/154, 706, 707, 177, 524/780; 523/451, 460

[56] References Cited

U.S. PATENT DOCUMENTS 3,477,986  11/1969  Hermann et al. .................... 524/154
3,578,615   5/1971  Moore et al. ........................ 523/451
3,699,077  10/1972  Murray ................................ 524/154

FOREIGN PATENT DOCUMENTS 3600395  8/1987  Fed. Rep. of Germany .

OTHER PUBLICATIONS

Haselmeyer et al., Defazet, 27, 529 (1973), ("Additive Fuer EPS-Pulver").

Primary Examiner—Lewis T. Jacobs

[57] ABSTRACT

Process for enhancing the electrostatic chargeability of powder coatings or powders, and the use thereof for surface coating solid objects.

Process for enhancing the electrostatic chargeability of powder coatings or powders intended for the surface-coating of solid objects, by homogeneously incorporating at least one salt-like, cationic compound of the formula (1)

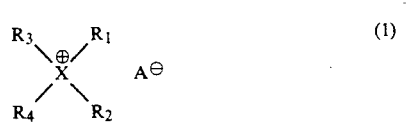

in which $R_1$, $R_2$, $R_3$ and $R_4$, independently of one another, denote hydrogen atoms, straight-chain or branched alkyl groups having 1 to 30 carbon atoms, mononuclear or polynuclear cycloaliphatic radicals having 5 to 12 carbon atoms, oxethyl groups of the general formula $-(CH_2-CH_2-O)_n-R$ in which n denotes a number from 1 to 10 and R denotes a hydrogen atom, a $(C_1-C_4)$alkyl or acyl group, furthermore denote mononuclear or polynuclear aromatic radicals or araliphatic radicals, where the aliphatic, aromatic and araliphatic radicals may be substituted, and where the alkyl, cycloalkyl, aralkyl and aryl radicals for $R_1$ to $R_4$ may be substituted by halogen atoms, X denotes a phosphorus, arsenic or antimony atom, where, in the case where X denotes an arsenic or antimony atom, at least one of the radicals $R_1$-$R_4$ is not a hydrogen atom, and $A^\ominus$ denotes the equivalent of an inorganic or organic anion, in an amount from about 0.01 to about 10 percent by weight into powder coatings or powders, the salt-like, cationic compounds of the formula (1) being dissolved or dispersed in the powder of coating system.

8 Claims, No Drawings

PROCESS FOR ENHANCING THE ELECTROSTATIC CHARGEABILITY OF POWDER COATINGS OR POWDERS, AND THE USE THEREOF FOR SURFACE-COATING SOLID OBJECTS

DESCRIPTION

Process for enhancing the electrostatic chargeability of powder coatings or powders, and the use thereof for surface-coating solid objects.

The present invention relates to a process for enhancing the electrostatic chargeability of powder coatings or powders by homogeneously incorporating salt-like, cationic compounds of a certain structure into the powder coatings or powders, and to the use of the powder coatings or powders treated in this manner for surface-coating solid objects (workpieces).

Powder coating technology is used, inter alia, in the coating of small objects, such as garden furniture, camping articles, household appliances, small automotive parts, refrigerators and shelves, and in the coating of workpieces with a complicated shape. For the most part, metallic objects are coated, but it is also possible, for example, to coat plastics using powder coating technology. Compared with other coating methods, such as brushing, dipping and conventional spraying, powder coating technology has a number of advantages. For example, the coating method does not involve solvents and is thus environmentally friendly and less expensive.

The method is also advantageous with regard to disposal, industrial safety (absence of combustible solvents), industrial hygiene, environmental protection and the time taken for a coating operation.

Powder coating technology is based on the principle of electrostatic charging. The powder coating or powder generally receives its electrostatic charge by one of the two following methods:
a) In the corona method, the powder coating or the powder is routed past a charged corona and charged.
b) In the triboelectric or electrokinetic method, use is made of the principle of frictional electricity. In a spray gun, the powder coating or the powder is given an electrostatic charge which is opposite to the charge of the frictional partner, generally a tube or spray pipe (for example made of polytetrafluoroethylene).

It is also possible to combine the two methods.

Powder coating resins employed are typically epoxy resins, carboxyl- and hydroxyl-containing polyester resins and acrylic resins, together with the appropriate curing agents. Combinations of resins are also used. Thus, for example, epoxy resins are frequently employed in combination with carboxyl- and hydroxyl-containing polyester resins.

Typical curing components for epoxy resins are, for example acid anhydrides, imidazoles and dicyandiamide and derivatives thereof. The curing components for hydroxyl-containing polyester resins are typically, for example acid anhydrides, blocked isocyanates, bisacylurethanes, phenolic resins and melamine resins, and curing components for carboxyl-containing polyester resins are typically, for example, triglycidyl isocyanurates or epoxy resins. The curing components used in acrylic resins are typically, for example, oxazolines, isocyanates, triglycidyl isocyanurates or dicarboxylic acids.

The method of charging the powder coatings or powders by frictional electricity has a number of advantages over the corona charging method. Thus, for example, the cost of producing and insulating the high voltage for operating the corona is superfluous, which increases, for example, the operational safety, in particular during hand operation.

In addition, it results in the spray guns becoming lighter, which is again important, above all, for hand spray guns.

Furthermore, powder paints which are electrostatically charged by means of friction have a more uniform charge and have less tendency towards back-spraying. ("Backspraying" is taken to mean the effect whereby powder coating particles already adhering to the sprayed workpiece detach themselves from the latter again and spray off in all directions). In addition, the spray lances of the application equipment, which operate on the principle of frictional charging, can be extended by several meters without difficulties, moved closer to the article to be sprayed and thus also introduced into pipes or cavities.

In contrast, it is frequently a problem in powder coatings sprayed by the frictional charge method that the powder particles are insufficiently charged and produce poor throwing power on the sprayed workpiece. (The term "throwing power" is a measure of the extent to which a powder coating is also deposited on the rear, in cavities, in cracks and above all in the spraying shadow and on internal edges and in internal corners).

The problem of inadequate charging is observed, in particular, in powder coatings which have been prepared on the basis of polyester resins, in particular carboxylcontaining polyesters, or on the basis of so-called mixed powders. Mixed powders are taken to mean powder coatings whose resin base comprises a combination of an epoxy resin and a carboxyl-containing polyester resin. The mixed powders form the basis for the powder coatings most frequently encountered in practice.

Whereas powder coatings on a pure epoxy resin basis can still be triboelectrically sprayed relatively well, the method (triboelectric spraying) is generally unsatisfactory when mixed powders or powder coatings based on polyester resins are used. This means that the choice of resins for triboelectrically sprayed powder coatings is greatly limited. This is very unsatisfactory inasmuch as it is precisely by means of the resin base that a very wide variety of properties of a powder coating can be adjusted. For this reason, it is at present not possible to satisfy all applicational demands in all cases using triboelectrically sprayed powder coatings, which explains the fact that this advantageous method is still not very widespread.

There was therefore a demand for providing powder coatings or powders based on a very wide variety of resins, in particular triboelectrically sprayable powder coatings, with a higher and more uniform charge, and to achieve the highest and most uniform deposition rate possible on spraying the workpiece, the other properties of the powder coating, such as the mechanical properties and processability, being impaired as little as possible.

A known process for improving the electrostatic charging of triboelectrically sprayable powder coatings comprises adding aluminum oxide (F. Haselmeyer, K. Oehmichen, DEFAZET, Vol. 27, No. 11, 1973, page 529). In this procedure, the aluminum oxide is added to the finished powder coating before spraying, typically in concentrations between 1 and 5 %. In this case, however, the material mentioned is not incorporated homogeneously into the powder coating, which results in difficulties, in particular, during continuous procedures.

If, on the other hand, the aluminum oxide is homogeneously incorporated (dispersed) into the powder coatings, it imparts its charge-increasing effect. The difficulties on adding aluminum oxide, for example, are that, in practice, the improvement in the electrostatic charge is only temporary. In addition, there are problems in mixing the powder coating and the additive uniformly, with separation of the powder coating and the additive and with abrasion in the charging zone.

A further attempt to improve the charging of triboelectrically sprayable powder coatings is described in German Offenlegungsschrift 3,600,395 A1. In this Offenlegungsschrift, the problem, known per se, of poor chargeability of triboelectrically sprayable powder coatings is likewise pointed out and, as a possible solution, the addition of capillary-active wetting agents based on quaternary ammonium compounds or the addition of, for example, metal-containing pigments, preferably zinc dust, is postulated only in a general manner.

Surprisingly, it has now been found that specific, salt-like, cationic compounds enhance the electrostatic chargeability of powder coatings and powders, in particular of triboelectrically sprayed powder coatings, if they are incorporated homogeneously. The higher electrostatic charging that this causes has, as a further positive effect, more uniform deposition of the sprayed powder coating or powder onto the coated object (workpiece) as a result.

The present invention therefore relates to a process for enhancing the electrostatic chargeability of powder coatings or powders intended for the surface-coating of solid objects (workpieces) by homogeneously incorporating at least one salt-like, cationic compound of the general formula (1)

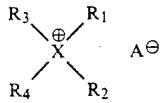

in which $R_1$, $R_2$, $R_3$ and $R_4$, independently of one another, denote hydrogen atoms, straight-chain or branched alkyl groups having 1 to 30 carbon atoms, preferably 1 to 22 carbon atoms, mononuclear or polynuclear cycloaliphatic radicals having 5 to 12 carbon atoms, such as, for example, cyclohexyl or cyclopentyl, oxethyl groups of the general formula —(CH$_2$—CH$_2$—O)$_n$—R in which n denotes a number from 1 to 10, preferably 1 to 4, and R denotes a hydrogen atom or a (C$_1$–C$_4$)alkyl or acyl group, such as, for example, the acetyl, benzoyl or naphthoyl group, further more mononuclear or polynuclear aromatic radicals, such as, for example, a phenyl, 1-naphthyl, 2-naphthyl, tolyl or biphenyl radical, or araliphatic radicals, such as, for example, the benzyl radical, where the aliphatic, aromatic and araliphatic radicals may be substituted by hydroxyl, (C$_1$–C$_4$)alkoxy, secondary or tertiary amino groups, such as, for example, mono(C$_1$–C$_6$)alkylamino or di(C$_1$–C$_6$)alkylamino groups, furthermore by acid amide groups, preferably aliphatic acid amide groups, such as, for example, the

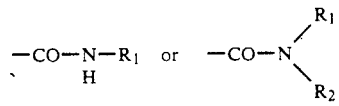

group in which $R_1$ and $R_2$ denote (C$_1$–C$_{30}$)alkyl groups, furthermore by acid imide groups, such as, for example, phthalimide or naphthalimide group, where the alkyl, cycloalkyl, aralkyl and aryl radicals for $R_1$ to $R_4$ may be substitued by fluorine, chlorine or bromine atoms, and the aliphatic radicals may be substituted, in particular, by 1 to 33 fluorine atoms, and in which X denotes a phosphorus, arsenic or antimony atom, preferably a phosphorous atom, where, in the case where X denotes an arsenic or antimony atom, at least one of the radicals $R_1$–$R_4$ is not a hydrogen atom, and $A^\ominus$ denotes the equivalent of an inorganic anion, such as for example, halide, preferably bromide or chloride, or sulfate, hydrogen sulfate, hydroxide, tetrafluoroborate, hexafluorophosphate, thiocyanate, perchlorate, hexafluoroarsenate, phosphate, such as metaor ortho-phosphate, molybdate, tungstate, phosphomolybdate or the equivalent or an anion of an iso-or heteropolyacid of phosphorus, molybdenum, tungsten or silicon, or of a phosphonic acid or the equivalent of an organic anion, such as, for example, of an aliphatic or aromatic carboxylic acid or sulfonic acid, preferably of a phenolcarboxylic or phenolsulfonic acid or naphtholcarboxylic or naphtholsulfonic acid, such as, for example, toluene-4-sulfonate, phenylsulfonate, alkylsulfonate, perfluoralkylsulfonate, such as, for example, trifluoromethansulfonate, 2-hydroxyphenyl-3-carboxylate, 2-hydroxynaphthyl-3-carboxylate, 2-hydroxynaphthyl-6-carboxylate or 4-methylphenyl-1-sulfonate, in an amount from about 0.01 to about 10 percent by weight, preferably from about 0.1 to about 5 percent by weight, into powder coatings or powders, the salt-like, cationic compounds of the general formula (1) mentioned being dissolved or dispersed in the powder or coating system.

The following may be mentioned as examples of individual compounds of the general formula (1) mentioned: tetraphenylphosphonium chloride, benzyltriphenylphosphonium chloride, methyltriphenylphosphonium bromide, tetrabutylphosphonium bromide, dodecyltributylphosphonium bromide phthalamidomethyltributyl-phosphonium bromide, hexadecyltributylphosphonium bromide, octadecyltributylphosphonium bromide, methyltriphenyl-phosphonium tetrafluoroborate, ethyltriphenylphosphonium tetrafluoroborate, methyltriphenylphosphonium hexafluoro-phosphate, tetraphenylphosphonium bromide, Bis-(4-phenyl) methylnaphthylphosphonium toluene-4- sulfonate, methyl-4-phenyldiphenylphosphonium toluene-4- sulfonate, methyl-3,5-bisphenyldiphenylphosphonium toluene-4-sulfonate, vinylbenzyltriphenylphosphonium toluene-4-sulfonate, bis-(4-methoxyphenyl)-methylphenylphosphoniutoluene-4-sulfonate, methyl-4-methoxyphenyldiphenylphosphonium toluene-4-sulfonate, bis-(4-methoxyphenyl)methylphenyl-phosphonium toluene-4-sulfonate, dodecyltributylphosphonium p-toluenesulfonate, bis-(4-methoxyphenyl) methyl- phenylphosphonium p-toluenesulfonate, bis-(3-hydroxypropyl)methylphenylphosphonium p-toluenesulfonate, bis-(4-acetoxyphenyl)methylphenylphosphonium p-toluene sulfonate, tris-(4- acetoxyphenyl)methylphosphonium toluene-4-sulfonate, methyltriphenylphosphonium toluene-4-sulfonate, dodecyltriphenylphosphonium toluene-4-sulfonate, methyltriphenylphosphonium phenylsulfonate ethyltri-phenylphosphonium toluene-4-sulfonate, phenethyltriphenyl-phosphonium toluene-4-sulfonate, ethylene bis-(triphenyl-phosphonium toluene-4-sulfonate), methyltriphenylphos-phonium tetraphenylborate, tris-(methoxyphenyl)methyl-phosphonium toluene-4-sulfonate, methyltritolylphosphonium toluene-4-sulfonate, tris- (chlorophenyl)methylphosphonium toluene-4-sulfonate, tris- (carbomethoxyphenyl)methyl-phosphonium toluene-4-sulfonate, benxyltriphenylphosphonium phosphomolybdate, benzyltriphenylphosphonium silico-tungstate, methyltriphenylphosphonium phosphomolybdate, benzyltriphenylphosphonium phosphotungstate, methyl-4-carbomethoxyphenyldiphenylphosphonium toluene-4-sulfonate, methyl-4-acetoxyphenyldiphenylphosphonium toluene-4-sulfonate, tetraoctylphosphonium hydroxide, and the quaternary phosphonium compounds mentioned, in their form as 2-hydroxynaphthyl-6-carboxylate or a 4-(3-hydroxy-2-naphthoylamino)phenylsulfonate or as 2- hydroxyphenyl-3-carboxylate.

The compounds used according to the invention may be in dissolved or dispersed form in the powder coating or powder. Incorporation can take place in a manner known per se, for example by mixing and extruding or kneading the salt-like compound into the basic resin, for example polyester resin. The compounds employed according to the invention can be added as a dried and ground powder, as a dispersion or as a masterbatch, or in another suitable form or in solution. In principle, it is also possible to add the compound as early as during preparation of the particular powder (coating) resins, i.e. during the polymerization or polycondensation thereof. An advantage of the compounds according to the invention is that incorporation takes place without specifically developed powder recipes being necessary to this end, which would again limit the general applicability of the compounds mentioned; incorporation of the compounds comprises merely adding them during the operation selected for this purpose during powder (coating) production; an additional process step is not necessary.

The advantage of having the compounds according to the invention in dissolved or dispersed form in the powder coating or powder is that all the powder particles have enhanced electrostatic chargeability to the same extent, i.e. non-uniform effects cannot occur. Non-uniform effects due to the addition rates, inadequate mixing or due to separation are equally excluded.

The compounds used according to the invention can be employed in pigmented or non-pigmented (clear coating), colored or non-colored powder coatings or powder coating systems.

Since addition of the salt-like, cationic compounds to enhance the chargeability and to improve the throwing power and deposition rate must, on the other hand, impair the other mechanical properties and the processability as little as possible, i.e. the amount added should be as low as possible, it is of great advantage that the compounds used according to the invention are highly active products.

The powder coatings or powders containing the cationic compounds of the formula (1) mentioned can be employed for coating, for example, metal, plastic, wood, ceramic, concrete, glass, textiles or paper.

It is of very particular advantage that the use of the compounds employed according to the invention in the powder coatings or powders, in particular in triboelectrically sprayable powder coatings, makes a relatively large choice of resins possible and opens up novel resin systems. Whereas essentially only powder coatings on a pure epoxy resin basis could hitherto be triboelectrically sprayed satisfactorily, it is now also possible to fall back on other resin systems. In particular, it is now possible to triboelectrically apply powder coatings based on polyester resins by using the compounds used according to the invention.

A further advantage of the use of the cationic compounds of the formula (1) mentioned is the increased deposition rate of the powder coatings. This makes shorter spraying times possible, which is favorable in many regards, for example reduces costs. In combination with the enhanced chargeability and the improved throwing power, it is possible to achieve not only increased deposition of the sprayed powder coating on large areas, but also uniform coating in cavities, internal edges and corners and on the rear of the objects. The sprayed objects (workpieces) can thus be coated more uniformly.

The powder coatings mentioned in the examples below are produced by extrusion and are comparable with one another with regard to the production process and the particle size distribution (mean particle size 50 μm). Tribospraying of the powders or powder coatings was carried out using the "Tribo Star" spray gun from Messrs. Intec (Dortmund) using a standard spraying pipe and star-shaped internal rod, at maximum powder throughput at a spraying pressure of 3 bar. The object to be sprayed, a multiedged metal cube (size about $5 \times 5 \times 5$ cm) was suspended in a spraying cabin and sprayed from a distance of 20 cm directly from the front without further movement of the spray gun. The charge of the sprayed powder in each case was measured using a "measuring instrument for measuring the triboelectric charge of powders" from Messrs. Intec (Dortmund). To carry out the measurements, the measurement antenna of the measuring instrument is held directly in the cloud of powder emerging from the spray gun. The current strength arising from the electrostatic charge of the powder coating or powder is indicated in μA. The throwing power and covering power were assessed visually. In particular, the extent to which rears, cavities, internal edges and corners and recesses behind edges were covered uniformly with surface coating was observed. Visual assessment is indicated in accordance with the DIN 53 230 evaluation scale 2.1 using scores from 0 to 5. On this scale, O is the best possible assessment and 5 the worst possible.

The examples below serve to illustrate the invention without representing a limitation. The parts indicated denote parts by weight.

Example 1 (comparative example)

A powder coating of the composition

| ® Alftalat AN 721 | (carboxyl-containing polyester from HOECHST AG) | 399 parts |
| ® Beckopox EP 303 | (epoxy resin type 3 from HOECHST AG) | 171 parts |
| ® Kronos 2160 | (titanium dioxide from Kronos Titan GmbH) | 295 parts |
| Blanc Fixe F | (barium sulfate from Sachtleben Chemie GmbH) | 100 parts |
| ® Additol XL 496 | (flow-control agent from HOECHST AG) | 30 parts |

| -continued | |
|---|---|
| Benzoin | 5 parts |
| | 1,000 parts | experiences an electrostatic charge corresponding to a current strength of 0.9 to 1.2 μA when sprayed triboelectrically using a star-shaped internal rod of length 38 cm. Visual assessment of the sprayed workpiece (spraying duration 5 seconds) gave the score 4; the amount of powder deposited after 5 seconds was 1.4 g.

When a star-shaped internal rod of length 15 cm is used, the powder coating experiences a charge corresponding to a current strength of 0.3 to 0.4 μA when sprayed triboelectrically.

Example 2

1 percent by weight of tetrabutylphosphonium bromide is incorporated homogeneously into a powder coating of the composition described in example 1 using a star-shaped internal rod of length 38 cm.

When sprayed triboelectrically using a star-shaped internal rod of length 38 cm, an electrostatic charge corresponding to a current strength of 2.4 to 2.6 μA is achieved.

Visual assessment of the sprayed workpiece (spraying duration 5 seconds) gave the score 2. The amount of powder deposited after 5 seconds was 1.6 g.

Example 3

A powder coating of the compositon described in example 2, but containing 2 percent by weight, in place of 1 percent by weight, of the additive mentioned therein experiences an electrostatic charge corresponding to a current strength of 3.2 to 3.4 μA when sprayed triboelectrically using a star-shaped internal rod of length 38 cm.

Visual assessment of the sprayed workpiece (spraying duration 5 seconds) gave the score 2. The amount of powder deposited after 5 seconds was 1.9 g.

Example 4

0.5 percent by weight of tetraphenylphosphonium bromide is incorporated homogeneously into a powder coating of the composition described in example 1.

When sprayed triboelectrically using a star-shaped internal rod of length 38 cm, an electrostatic charge corresponding to a current strength of 2.4 to 2.6 μA is achieved.

Visual assessment of the sprayed workpiece (spraying duration 5 seconds) gave the score 2. The amount of powder deposited after 5 seconds was 1.8 g.

When a star-shaped internal rod of length 15 cm is used, the powder coating experiences a charge corresponding to a current strength of 1.9 μA when sprayed triboelectrically.

Example 5

A powder coating of the composition described in example 4, but containing 1 percent by weight, in place of 0.5 percent by weight, of the additive mentioned therein experiences an electrostatic charge corresponding to a current strength of 3.9 to 4.1 μA when sprayed triboelectrically using a star-shaped internal rod of length 38 cm.

Visual assessment of the sprayed workpiece (spraying duration 5 seconds) gave the score 2. The amount of powder deposited after 5 seconds was 2.0 g.

When a star-shaped internal rod of length 15 cm is used, the powder coating experiences a charge corresponding to a current strength of 2.6 to 2.8 μA when sprayed triboelectrically.

Example 6 (comparative example)

A powder comprising pure styrene-methacrylic copolymer (®Dialec S 309 from Messrs. Diamond Shamrock) experiences an electrostatic charge corresponding to a current strength of ±0 μA when sprayed triboelectrically both when a star-shaped internal rod of length 38 cm is used and when a star-shaped internal rod of length 15 cm is used.

Example 7

1 percent by weight of the additive mentioned in example 2 is incorporated homogeneously into a powder of the composition described in example 6. When sprayed triboelectrically using a star-shaped internal rod of length 38 cm, an electrostatic charge corresponding to a current strength of 7.8 to 8.0 μA is achieved.

When a star-shaped internal rod of length 15 cm is used, the powder experiences a charge corresponding to a current strength of 4.8 to 5.0 μA when sprayed triboelectrically.

Example 8

1 percent by weight of the additive mentioned in example 6 is incorporated homogeneously into a powder of the composition described in example 4. When sprayed triboelectrically, an electrostatic charge corresponding to a current strength of 7.6 to 8.0 μA is achieved when a star-shaped internal rod of length 38 cm is used.

When a star-shaped internal rod of length 15 cm is used, the powder experiences a charge corresponding to a current strength of 4.5 to 5.0 μA.

Example 9

1 percent by weight of tetrabutylphosphonium chloride is incorporated homogeneously into a powder as described in example 6.

When sprayed triboelectrically using a star-shaped internal rod of length 38 cm, an electrostatic charge corresponding to a current strength of 8.0 to 8.2 μA is achieved.

When a star-shaped internal rod of length 15 cm is used, the powder experiences a charge corresponding to a current strength of 5.0 to 5.2 μA when sprayed triboelectrically.

Example 10

1 percent by weight of tributylhexadecylphosphonium bromide is incorporated homogeneously into a powder as described in example 6.

When sprayed triboelectrically using a star-shaped internal rod of length 38 cm, the powder experiences a charge corresponding to a current strength of 7.4 to 7.8 μA.

When a star-shaped internal rod of length 15 cm is used, the powder coating experiences a charge corresponding to a current strength of 4.6 to 5.0 μA when sprayed triboelectrically.

Example 11

1 percent by weight of tetraoctylphosphonium hydroxide is incorporated homogeneously into a powder as described in example 6.

When sprayed triboelectrically using a star-shaped internal rod of length 38 cm, the powder experiences a charge corresponding to a current strength of 2.6 to 2.8 μA.

When a star-shaped internal rod of length 15 cm is used, the powder experiences a charge corresponding to a current strength of 1.8 to 1.9 μA when sprayed triboelectrically.

Example 12

1 percent by weight of tetraoctylphosphonium bromide is incorporated homogeneously into a powder as described in example 6.

When sprayed triboelectrically using a star-shaped internal rod of length 38 cm, the powder experiences a charge corresponding to a current strength of 3.9 to 4.1 μA.

When a star-shaped internal rod of length 15 cm is used, the powder experiences a charge corresponding to a current strength of 3.0 to 3.2 μA when sprayed triboelectrically.

We claim:

1. A process for enhancing the electrostatic chargeability of a triboelectrically sprayable powder coating composition consisting essentially of (1) an epoxy resin; or (2) a hydroxyl- or carboxyl-containing polyester resin; or (3) an acrylic resin; or (4) a combination of hydroxyl- or carboxyl-containing polyester resin and epoxy resin or a combination of (1), (2), (3) or (4) with each other, intended for surface-coating solid objects, which comprises homogeneously incorporating, by dissolving or dispersing into said powder coating composition, at least one salt-like, cationic compound of the formula (1)

(1)

in which $R_1$, $R_2$, $R_3$ and $R_4$, independently of one another, denote hydrogen atoms, straight-chain or branched alkyl groups having 1 to 30 carbon atoms, mononuclear or polynuclear cycloaliphatic radicals having 5 to 12 carbon atoms, oxethyl groups of the formula $-(CH_2-CH_2-O)_n-R$ in which n denotes a number from 1 to 10 and R denotes a hydrogen atom, a $(C_1-C_4)$alkyl or acyl group, furthermore denote mononuclear or polynuclear aromatic radicals or araliphatic radicals, where the aliphatic, aromatic and araliphatic radicals may be substituted by hydroxyl, $(C_1-C_4)$alkoxy, secondary or tertiary amino groups, acid amide groups and/or acid imide groups, and where the alkyl, cycloakyl, aralkyl and aryl radicals for $R_1$ to $R_4$ may be substituted by fluorine, chlorine or bromine atoms, X denotes a phosphorus, arsenic or antimony atom, where, in the case where X denotes an arsenic or antimony atom, at least one of the radicals $R_1$-$R_4$ is not a hydrogen atom, and $A^\ominus$ denotes the equivalent of an inorganic or organic anion, in an amount from about 0.01 to about 10 percent by weight into powder coatings.

2. The process as claimed in claim 1, wherein, in the formula (1) mentioned therein, $R_1$, $R_2$, $R_3$ and $R_4$, independently of one another, denote alkyl groups having 1 to 22 carbon atoms, phenyl groups, benzyl groups and/or oxethyl groups of the formula $-(CH_2-CH_2-O)_n-R$ in which n denotes a number from 1 to 10 and R denotes a hydrogen atom, a $(C_1-C_4)$alkyl or acyl group, and $A^\ominus$ denotes chloride, bromide, sulfate, hydrogen sulfate, hydroxide, tetrafluoro-borate, hexafluorophosphate, thiocyanate, perchlorate, hexafluoroarsenate, metaphosphate, ortho-phosphate, molybdate, tungstate, phosphomolybdate, the equivalent of an anion of an iso- or heteropolyacid of phosphorus, molybdenum, tungsten or silicon, of a phosphonic acid, phenolcarboxcylic acid, phenol-sulphonic acid, naphtholcarboxyclic acid or naphtholsulfonic acid.

3. The process as claimed in claim 1, wherein the cationic compounds of the formula (1) mentioned in claim 1, are homogeneously incorporated into the powder coating composition in an amount from about 0.1 to about 5 percent by weight.

4. The process as claimed in claim 1, wherein the cationic compounds of the formula (1) mentioned in claim 1 are incorporated homogeneously in the form of a dried and ground powder or in the form of a dispersion, of a masterbatch or a solution, into the powder coating composition.

5. A triboelectrically sprayable powder coating composition consisting essentially of (1) an epoxy resin; or (2) a hydroxyl- or carboxyl-containing polyester resin; or (3) an acrylic resin; or (4) a combination of hydroxyl- or carboxyl-containing polyester resin and epoxy resin, or combinations thereof, and, homogeneously distributed, dissolved, or dispersed, in said powder coating composition, about 0.01 to about 10 percent by weight of at least one salt-like, cationic compound of the formula (1)

(1)

in which $R_1$, $R_2$, $R_3$ and $R_4$, independently of one another, denote hydrogen atoms, straight-chain or branched alkyl groups having 1 to 30 carbon atoms, mononuclear or polynuclear cycloaliphatic radicals having 5 to 12 carbon atoms, oxethyl groups of the formula $-(CH_2-CH_2-O)_n-R$ in which n denotes a number from 1 to 10 and R denotes a hydrogen atom, a $(C_1-C_4)$-alkyl or acyl group, furthermore denote mononuclear or polynuclear aromatic radicals or araliphatic radicals, where the aliphatic, aromatic and raliphatic radicals may be substituted by hydroxyl, $(C_1-C_4)$alkoxy, secondary or tertiary amino groups, acid amide groups and/or acid amide groups, where the alkyl, cycloalkyl, aralkyl and aryl radicals for $R_1$ to $R_4$ may be substituted by fluorine, chlorine or bromine atoms, X denotes a phosphorus, arsenic or antimony atom, where, in the case where X denotes an arsenic or antimony atom, at least one of the radicals $R_1$-$R_4$ does not denote a hydrogen atom, and $A^\ominus$ denotes the equivalent of an inorganic or organic anion.

6. The process of claim 1, wherein said acrylic resin is a styrene-methacrylic copolymer.

7. The powder coating of claim 5, wherein said acrylic resin is a styrene-methacrylic copolymer.

8. A method for surface-coating of an object made of metal, wood, plastic, glass, ceramic, concrete, textile material, paper or rubber comprising the step of applying to said object a powder coating composition of claim 5.

* * * * *

UNITED STATES PATENT AND TRADEMARK OFFICE
CERTIFICATE OF CORRECTION

PATENT NO. : 5,021,473
DATED : 6/4/91
INVENTOR(S) : Hans-Tobias Macholdt, Alexander Sieber, Claus Godau and Albrecht Manz It is certified that error appears in the above-identified patent and that said Letters Patent is hereby corrected as shown below:

In the Abstract

In the line second from the last "of" should read --or--.

In column 4, line 23, "metaor" should read --meta- or--.

In claim 5, column 10, line 57, "raliphatic" should read --araliphatic--.

Signed and Sealed this

Thirteenth Day of October, 1992

Attest:

DOUGLAS B. COMER

*Attesting Officer*  *Acting Commissioner of Patents and Trademarks*